Oct. 9, 1945.  R. P. DINSMORE  2,386,666
THREAD-LIKE STRUCTURE
Original Filed Dec. 20, 1935
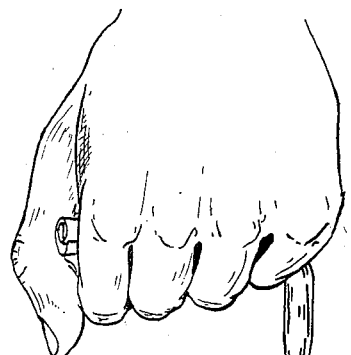
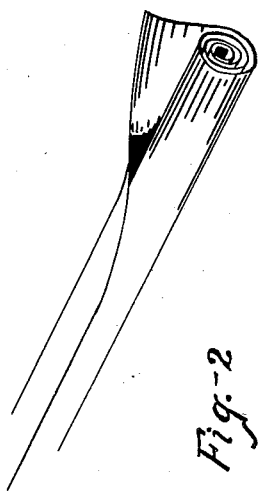
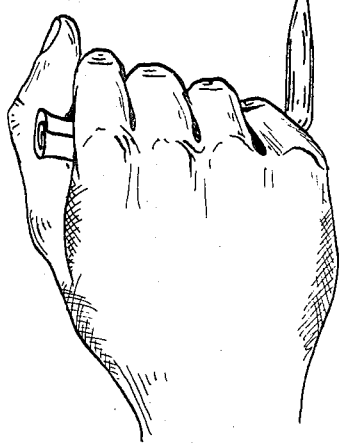
Fig.-1
Fig.-2
INVENTOR.
RAY P. DINSMORE
BY R. H. Waters Patented Oct. 9, 1945

2,386,666

UNITED STATES PATENT OFFICE 2,386,666

THREADLIKE STRUCTURE

Ray P. Dinsmore, Akron, Ohio, assignor to Wingfoot Corporation, Akron, Ohio, a corporation of Delaware Original application December 20, 1935, Serial No. 55,392. Divided and this application April 9, 1940, Serial No. 328,687

6 Claims. (Cl. 18—48)

This invention relates to thread-like structures made of a stretched rubber hydrochloride. More particularly it relates to thread-like structures which are made by twisting a strip of rubber hydrochloride film and stretching it to form an elongated mass of thread or cord size. The invention includes fabrics made from such thread-like structures, which fabrics may be made entirely of rubber hydrochloride or mixtures of rubber hydrochloride threads and threads of other materials, such as cotton, wool, silk, and artificial silks. For example, it includes cotton fabric such as that used for the manufacture of tires or belts, etc., which comprises a pick composed essentially of rubber hydrochloride.

This application is a division of my application Serial No. 55,392, filed December 20, 1935.

According to this invention rubber is hydrochlorinated, film is made from the rubber hydrochloride and then a thread-like structure is produced from the film by compacting a narrow width of the film as by tightly twisting a ½" or 1" strip and then stretching this compacted film. The amount of stretching may vary, particularly if plasticizers, etc., are added to the film. A convenient stretch is that which the average man can readily apply to the twisted film by pulling on opposite ends of it. As the twisted film is stretched it loses, to a marked degree, the ability of further stretching and the final stretched structure has sufficient tensile strength for many uses.

The film to be stretched may be made by hydrochlorinating a benzene rubber cement until the chlorine content of the product is about 30%. This may be precipitated in alcohol and washed on a rubber mill and then dissolved in any suitable solvent such as chloroform or benzene to produce a solution from which the film may be cast. It is preferable to evaporate all of the solvent from the film before stretching it, although the stretching may be effected before all the solvent has been evaporated. The preparation of a rubber hydrochloride solution suitable for casting will be described in detail below in connection with the production of filaments by extrusion. The cement used for extrusion may be cast into the film which is to be twisted and stretched as here described.

The conditions for producing a stretched, extruded filament may vary. The extruded filament may contain more or less solvent when stretched. Complete freedom from solvent may be advantageous. The stretching may be effected at a higher or lower temperature.

In the drawing, Fig. 1 represents the stretching of compacted film by hand, and Fig. 2 illustrates the resulting product.

In producing the hydrochlorinated product pure rubber hydrochloride cement may be employed. Rubber hydrochloride which contains in the neighborhood of 29.5 to 30% of chlorine is preferred. The chlorine content may be somewhat higher or lower as for example 28 or 28.5% up to 30.5%. Rubber hydrobromide may be used instead of rubber hydrochloride. Although a pure hydrohalide of rubber is in general preferred it may contain some halogen such as chlorine or bromine or other element or elements in addition to the hydrogen and halogen of the hydrohalide. In this event the content of chlorine present as hydrochloride or the amount of other halogen present as hydrohalide will be somewhat less than that required for the pure hydrogen halide.

The rubber hydrochloride cement may contain some plasticizer although this is not necessary. Too much plasticizer will, in general, weaken the filament produced. An addition of two per cent of butyl stearate or ½% of butyl stearate and 1½% of paraffin has been found to give a satisfactory filament. When plasticizers are used it has been found, in general, that greater stretching during manufacture is required to give a final product of the same strength as produced when no plasticizer is employed.

It has been found that rubber hydrochloride structures which contain a trace or more of hydrogen chloride are less stable than similar structures which are free from hydrogen chloride. Various photochemical inhibitors have been found to increase the life of the rubber hydrochloride when exposed to sunlight. It is, therefore, preferable to employ a rubber hydrochloride which is free from hydrogen chloride and which contains a trace of a photochemical inhibitor. The rubber hydrochloride cement is advantageously neutralized by treatment with a solid alkali such as soda ash, to remove excess hydrogen chloride and at the same time remove organic acids which may hasten decomposition of the rubber hydrochloride. A solid neutralizing agent which precipitates the neutralization by-products out of the cement is desirable to free the cement from all traces of hydrogen chloride. Photochemical inhibitors which may be employed include the following which may be used in small amounts, singly or in combination as described in Calvert U. S. Patent 1,989,632: hexamethylene tetramine, dicyclohexylamine, ditetrahydrofurfurylamine, methylaminoacetonitrile, tetramethyl thiuram disulphide, etc.

A thread-like structure of rubber hydrochloride may be advantageously used as the picks of cord fabric used in the manufacture of tires, belts, and other rubber products. For example, a yarn may be woven as the picks of cord tire fabric, using several picks per inch. Rubber will be calendered onto the fabric in the usual manner to build up a tire. When the tire is vulcanized the picks will soften and will blend, at least in part, with the rubber of the tire. The tire is, therefore, for all practical purposes, as free from picks as a tire made from pickless cord fabric. Cord fabric for belts may similarly be prepared with rubber hydrochloride picks which will disappear during vulcanization.

If the fabric is calendered at a sufficiently high temperature, the picks may be wholly or in part absorbed during the calendering operation. Since the rubber hydrochloride tends to shrink on heating, the cords should be spaced to allow for shrinkage which will result from any low-temperature heating to which the fabric is subjected prior to calendering.

Any acid liberated on heating the rubber hydrochloride may be neutralized by alkali compounded with the rubber, or the filaments may be coated with an alkaline lubricant to neutralize such acid, or other means may be provided for neutralizing any acid which is liberated. This will be found particularly desirable in the manufacture of tires, etc., from rayon fabric in which the cords are made of a cellulose derivative which is attacked by hydrochloric acid.

Similarly, tires, belts and other rubber goods may be made of cord fabric in which the cord is cotton or rayon or other suitable material and the picks are made of a halogenated rubber, e. g. chlorinated rubber or other material made from rubber or a rubber-like material or derivative thereof which softens and blends with the rubber at a processing temperature not higher than that employed for vulcanization.

I claim:

1. The method of producing a thread-like structure of a rubber hydrohalide which comprises compacting a solvent-free strip of the rubber hydrohalide throughout its length and stretching it to increase its tensile strength.

2. A thread-like structure of a rubber hydrochloride stretched to increase its tensile strength which is composed of a pellicle of rubber hydrochloride compacted throughout its length with contacting surfaces of the compacted material being separable.

3. Fabric which comprises a thread-like structure of rubber hydrochloride film stretched lengthwise of said structure to increase its tensile strength and compacted together, contacting surfaces of the compacted material being separable.

4. The method of producing a thread-like structure of a rubber hydrohalide which comprises twisting a solvent-free strip of the rubber hydrohalide film and stretching it to increase its tensile strength.

5. A thread-like rubber hydrohalide structure stretched to increase its tensile strength which is composed of a twisted strip of rubber hydrohalide film which can be untwisted.

6. A thread-like structure formed of a pellicle of rubber hydrochloride compacted throughout its length and stretched while in a solvent-free condition to increase its tensile strength.

RAY P. DINSMORE.